US012536574B2

(12) United States Patent
Rivera et al.

(10) Patent No.: US 12,536,574 B2
(45) Date of Patent: Jan. 27, 2026

(54) DYNAMIC PRODUCT PRESENTATION OF MEDIA ELEMENTS

(71) Applicant: Shopify Inc., Ottawa (CA)

(72) Inventors: Carl Rivera, Tuxedo Park, NY (US); Daniel Debow, Toronto (CA); Kasra Nejatian, Love Beach (BS)

(73) Assignee: Shopify Inc., Ottawa (CA)

( * ) Notice: Subject to any disclaimer, the term of this patent is extended or adjusted under 35 U.S.C. 154(b) by 294 days.

(21) Appl. No.: 17/515,127

(22) Filed: Oct. 29, 2021

(65) Prior Publication Data

US 2023/0140629 A1 May 4, 2023

(51) Int. Cl.
*G06Q 30/0601* (2023.01)
(52) U.S. Cl.
CPC ..... *G06Q 30/0631* (2013.01); *G06Q 30/0621* (2013.01)
(58) Field of Classification Search
CPC .......... G06Q 30/0631; G06Q 30/0601; G06Q 30/0641; G06Q 30/0621; G06Q 30/0255; G06Q 30/0253; G06Q 30/0269; G06Q 30/0635; G06Q 20/322; G06Q 20/401; G06Q 10/083; G06Q 30/00; G06Q 30/02
USPC ....................................................... 705/26.5
See application file for complete search history.

(56) References Cited

U.S. PATENT DOCUMENTS 10,127,596 B1* 11/2018 Franke ................ G06Q 30/0631
10,937,078 B1*  3/2021 Barrientos ......... G06Q 30/0631
11,100,511 B1*  8/2021 Rule ..................... G06F 40/174
11,210,730 B1* 12/2021 Woodyard ............. G06Q 20/12
2006/0020662 A1*  1/2006 Robinson ............... H04L 12/00
                                                              709/203
2010/0235241 A1*  9/2010 Wang .................. G06Q 30/0255
                                                              705/26.1
2014/0229270 A1*  8/2014 Rashwan ........... G06Q 30/0277
                                                              705/14.43
2015/0348106 A1* 12/2015 Yao .................... G06Q 30/0256
                                                              705/14.54
2015/0356087 A1* 12/2015 Alvino ................... G06Q 30/02
                                                              707/728

(Continued)

FOREIGN PATENT DOCUMENTS

WO     WO-2010048624 A1 *  4/2010   ......... G06Q 30/0601

OTHER PUBLICATIONS

"Payload,n," 2005, Oxford English Dictionary, Oxford UP, https://doi.org/10.1093/OED/2146318806. (Year: 2005).*

(Continued)

*Primary Examiner* — Gautam Ubale
(74) *Attorney, Agent, or Firm* — Foley & Lardner LLP

(57) ABSTRACT

Disclosed herein are methods and systems for dynamic revision and customization of media elements. In an embodiment, responsive to a request to load a page having a media element indicative of a product that has not been viewed on a second page by a user, a processor retrieves data corresponding to at least a commerce attribute of the user; generates a payload comprising a customized attribute of the product based on a user purchase preference extracted from the retrieved data; and transmit the payload to a webserver hosting the page having the media element, wherein the payload instructs the webserver to revise a default attribute of the media element to present the product with the customized attribute when loading the page.

20 Claims, 9 Drawing Sheets

(56) References Cited

U.S. PATENT DOCUMENTS

| | | | |
|---|---|---|---|
| 2019/0073697 A1* | 3/2019 | Varley | G06Q 30/0276 |
| 2020/0183554 A1* | 6/2020 | Al-Sallami | G06F 40/103 |
| 2021/0241299 A1* | 8/2021 | Ramini | G06N 5/025 |
| 2021/0390570 A1* | 12/2021 | Rabenold | G06Q 30/0206 |

OTHER PUBLICATIONS

E-marketing_and_digital_communications_Implementing_an_effective_knowledge_based_targeted_e-marketing_campaign (Year: 2009).*

Ad_Injection_at_Scale_Assessing_Deceptive_Advertisement_Modifications (Year: 2015).*

* cited by examiner

FIG. 2

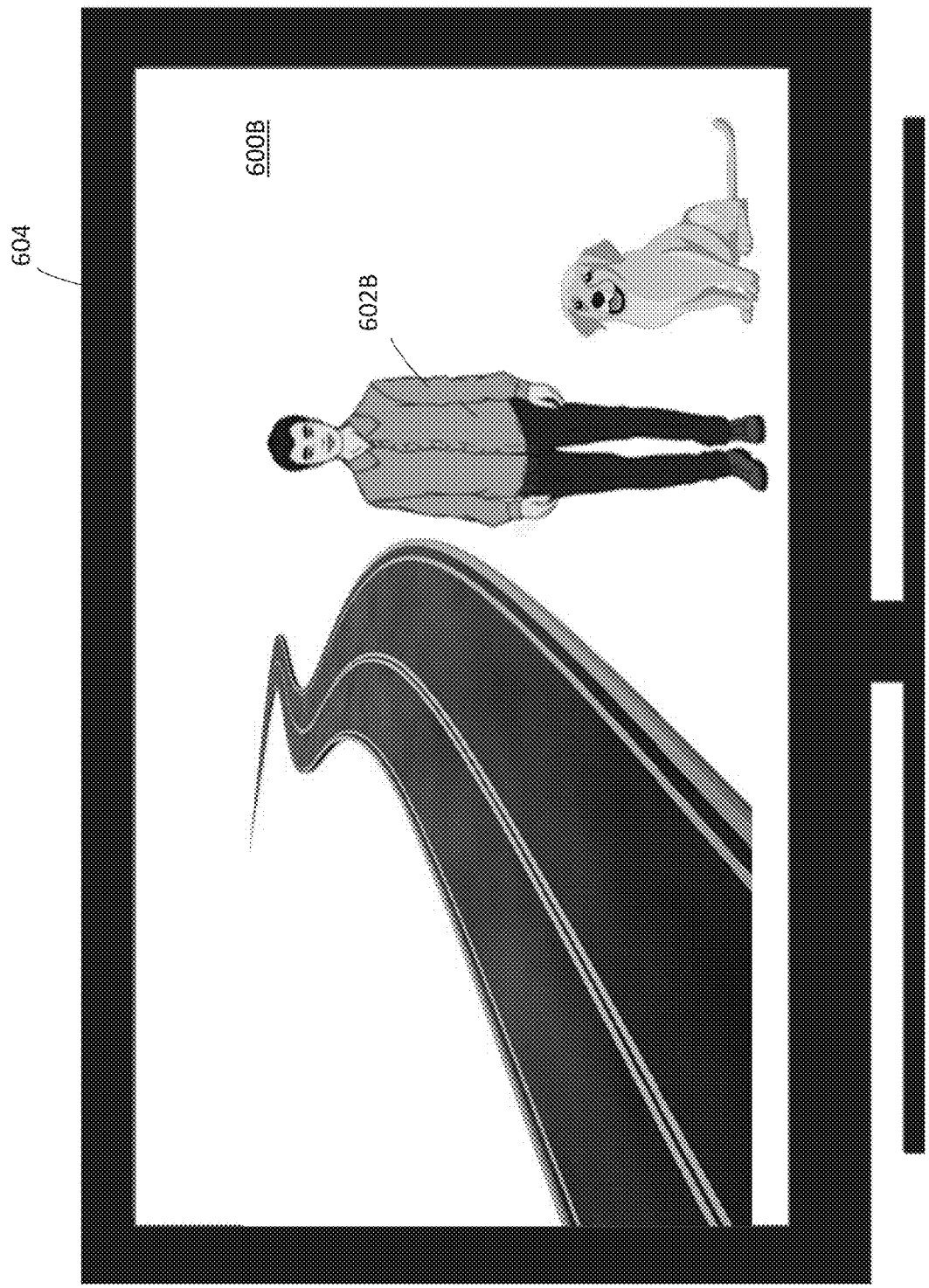

FIG. 7

DYNAMIC PRODUCT PRESENTATION OF MEDIA ELEMENTS

TECHNICAL FIELD

This application relates generally to graphical user interfaces, and, more particularly, to dynamic revision of graphical user interfaces.

BACKGROUND

When a user conducts an online search for a particular item, conventional content providers may customize a website by including content that shows the searched item and is linked to a merchant website offering the item, such as showing a brand of sneakers available from a merchant after the user searched for that brand or viewed a page with those sneakers. However, conventional methods do not customize the content itself based on the users' purchase behavior or preferences.

BRIEF DESCRIPTION OF THE DRAWINGS

The accompanying drawings constitute a part of this specification and illustrate embodiments of the subject matter disclosed herein.

FIG. 2 shows a home page of an administrator, according to an embodiment.

FIG. 7 shows an example of a checkout page, according to various embodiments.

DETAILED DESCRIPTION

Figure 1:
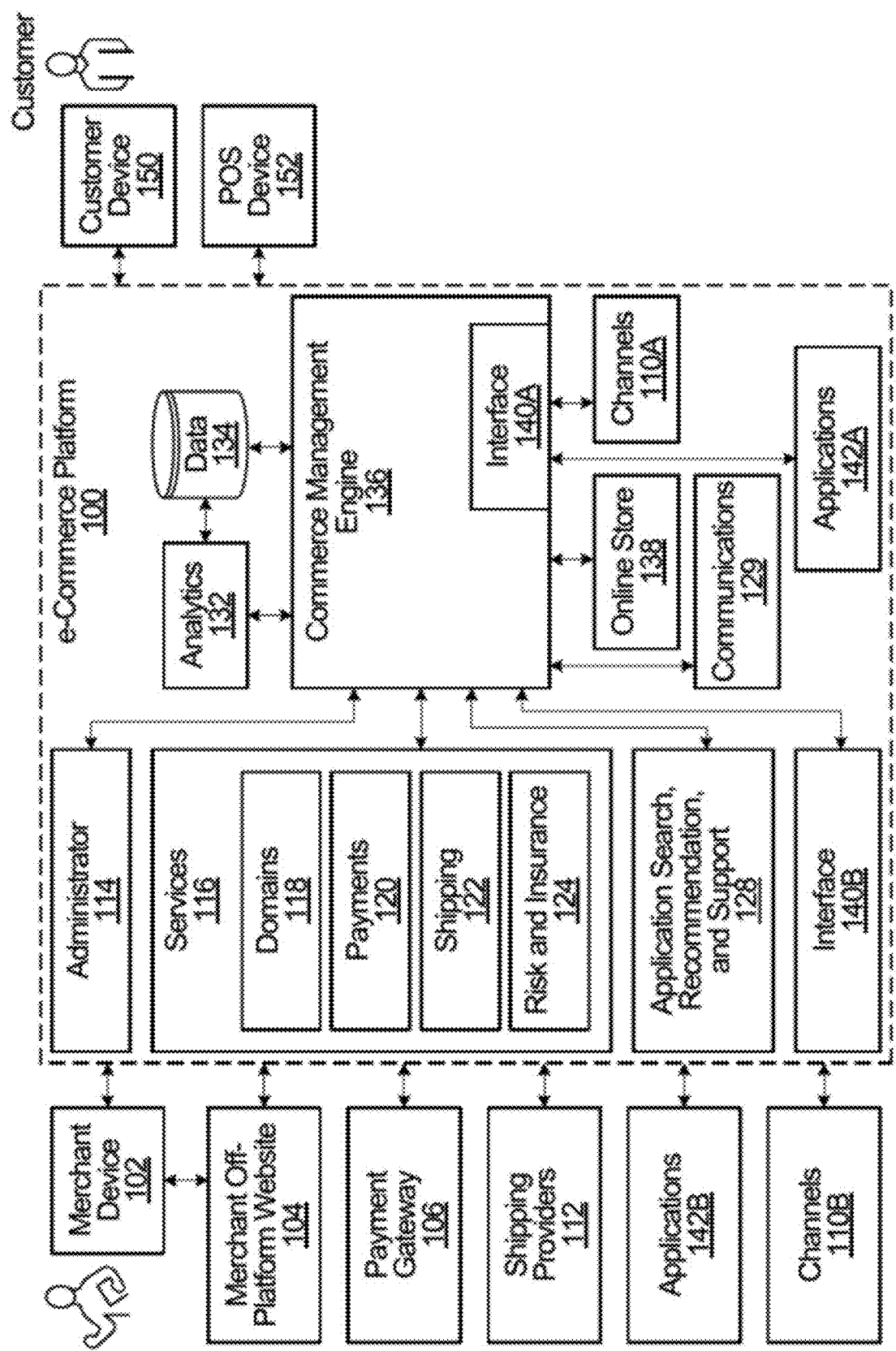
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

To address the above-described drawbacks, a server (referred to herein as an analytics server) may customize attributes of products depicted in different media elements for different customers/users. The analytics server may transmit electronic instructions to a webserver hosting the media element(s), such that the webserver can render and present the image/media of a product that includes user preferences extracted from their purchase behavior and not based solely on their recent browsing history/activity. The server may cause a local application executing on the customer's electronic device to instruct the webserver to customize its electronic content accordingly. The customization may include customizing various characteristics of the product depicted within a media element (e.g., using a particular color or pattern) and/or customizing various other commercial attributes (e.g., applying certain discounts or preferred payment methods or customizing written content associated with the product).

I. Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through 'buy buttons' that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant device 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Even though the shipping services 122 is shown as a part of the e-commerce platform 100, the shipping services 122 may be implemented by a third party, such as a third party delivery or shipping service. The shipping service 122 may have a server/computer in communication with the e-commerce platform 100 where the shipping service 122 may communicate shipping requirements (e.g., shipping weight, categories, restrictions, and preferences). The e-commerce platform 100 may then use these requirements to dynamically update one or more graphical user interfaces discussed herein. The shipping service 122 may then receive delivery instructions from the e-commerce platform 100 and may perform the delivery using a delivery apparatus discussed herein. The shipping service 122 may also be in communication with a delivery provider's servers and/or a delivery apparatus processor, such delivery data (e.g., status of different deliveries) can be communicated to the e-commerce platform 100.

Therefore, shipping service 122 may or may not be a part of the e-commerce platform 100. For instance, the shipping service 122 may be associated with a separate entity that transmits its requirements and receives delivery instructions from the e-commerce platform 100. In another embodiment, the methods and systems discussed herein may be provided as a standalone service where the shipping service 122 utilizes the e-commerce platform 100 to dynamically customize graphical user interfaces and transmit delivery instructions and attributes back to the shipping service 122.

In a non-limiting example, the shipping service 122 represents a server of a delivery platform that utilizes a drone to deliver food. The shipping service 122 first transmits drone delivery requirements to the e-commerce platform 100, such that various graphical user interfaces are revised accordingly. When the customer's order is finalized, the e-commerce platform 100 transmits delivery data (e.g., items and address) to the shipping service 122.

Figure 2:
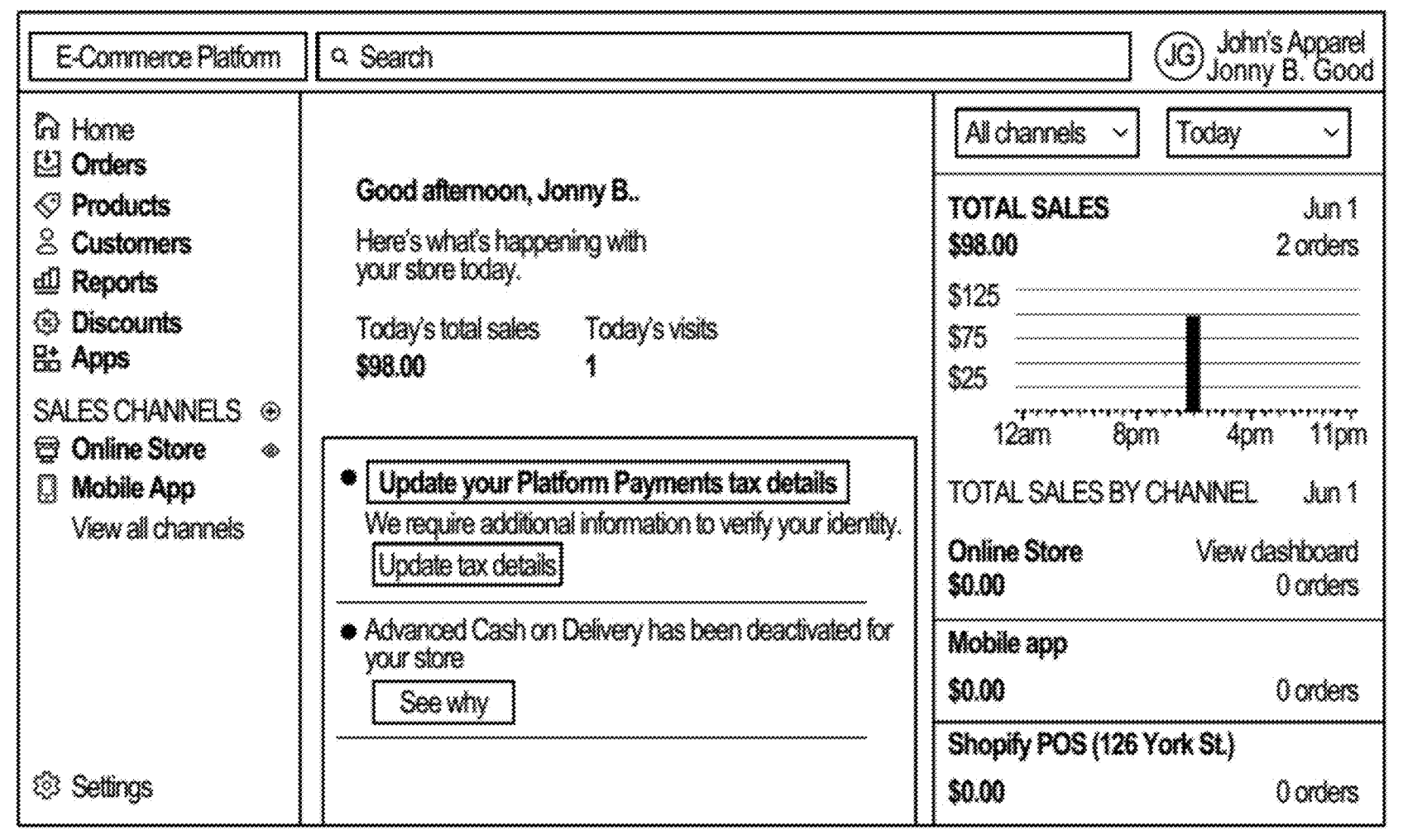

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B.

The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and may track quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

II. Example Networked Components of System

Figure 3:
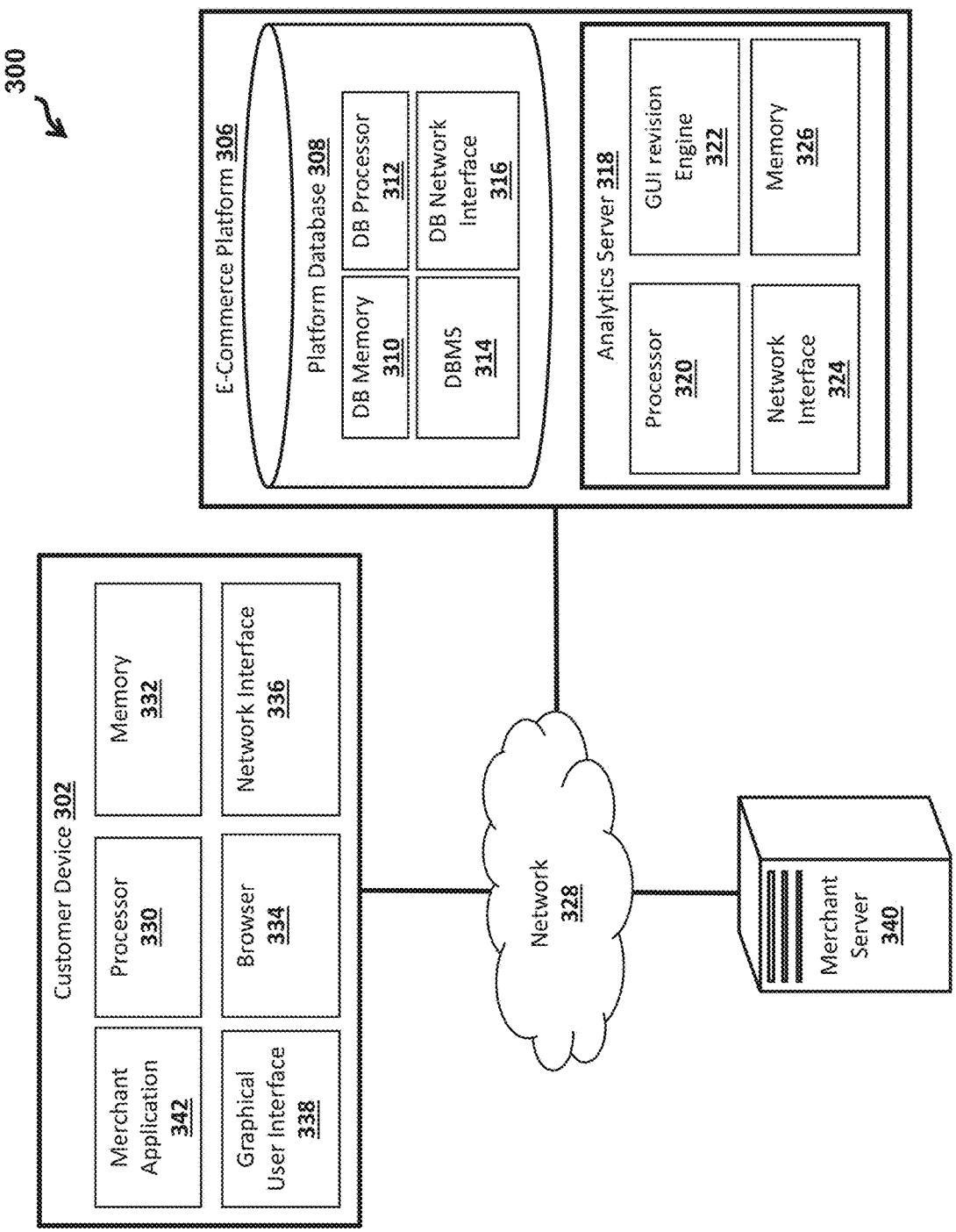
FIG. 3 shows components of a dynamic product presentation system, according to an embodiment.

FIG. 3 illustrates components of a dynamic product presentation system 300, according to an embodiment. The system 300 includes a customer device 302 and a merchant server 340 to connect with an e-commerce platform 306 via a network 328. The depicted system 300 is described and shown in FIG. 3 as having one of each component for ease of description and understanding of an example. The embodiments may include any number of the components described herein. The embodiments may comprise additional or alternative components, or may omit certain components, and still fall within the scope of this disclosure.

The network 328 may include any number of networks, which may be public and/or private networks. The network 328 may comprise hardware and software components implementing various network and/or telecommunications protocols facilitating communications between various devices, which may include devices of the system 300 or any number of additional or alternative devices not shown in FIG. 3. The network 328 may be implemented as a cellular network, a Wi-Fi network, or other wired local area network (LAN) or wireless LAN, a WiMAX network, or other wireless or wired wide area network (WAN), and the like. The network 328 may also communicate with external servers of other external services coupled to the network 328 such as servers hosting a social media platform, a banking platform, or the merchant server 340.

The network 328 may include any number of security devices or logical arrangements (e.g., firewalls, proxy servers, DMZs) to monitor or otherwise manage web traffic to the e-commerce platform 306. Security devices may be configured to analyze, accept, or reject incoming web requests from the customer device 302, the merchant server 340, and/or the customer device 302. In some embodiments, the security device may be a physical device (e.g., a firewall). Additionally or alternatively, the security device may be a software application (e.g., Web Application Firewall (WAF)) that is hosted on, or otherwise integrated into, another computing device of the system 300. The security devices monitoring web traffic are associated with and administered by the e-commerce platform 306.

The customer device 302 may be any electronic device comprising hardware and software components capable of performing the various tasks and processes described herein. Non-limiting examples of the customer device 302 may include mobile phones, tablets, laptops, and personal computers, among others. When communicating with components of the e-commerce platform 306, the customer device 302 may generate web traffic (or web session data) that is processed by or otherwise accessible to the analytics server 318 of the e-commerce platform 306. The web traffic may comprise data packets that include various types of data that can be parsed, analyzed, or otherwise reviewed by various programmatic algorithms of the analytics server 318. For instance, the web traffic data may indicate which website was accessed by a customer operating the customer device 302 (e.g., whether a customer operating the customer device 302 has accessed a website hosted by the merchant server 340 where the website displays one or more media elements, such as an image or a video stream).

In an example, a customer operating the customer device 302 visits a website of a merchant (e.g., an online store of the merchant or a merchant's online store) hosted by the merchant server 340 using the browser 334. The merchant's online store may include one or more features hosted (or otherwise produced or functionally controlled) by the analytics server 318. For instance, the analytics server 318 of the e-commerce platform 306 may provide (e.g., host) at least a portion of a webpage for the merchant's online store to the customer device 302 (e.g., checkout page). In another example, the analytics server 318 may revise one or more features displayed on the merchant's online store. The browser 334 may transmit and receive data packets in order to display various features of the merchant's online store on a GUI 338.

The merchant's online store may refer to any electronic platform that is directly or indirectly hosted by a merchant associated with the merchant server 340. For instance, the merchant's online store may be a website displayed on a browser or a mobile application that is hosted (or otherwise functionally controlled) by the merchant server 340 and/or the analytics server 318. In the embodiments where the merchant's online store is website, a customer operating the customer device 302 may execute the browser 334 (or other applications) to connect the customer device 302 to the analytics server 318 and/or the merchant server 340 using an IP Address obtained by translating a domain name of the website. The analytics server 318 and/or the merchant server 340 may execute code associated with the website and render the appropriate graphics to be presented to the GUI 338. In embodiments where the merchant's online store is a mobile application, the customer device 302 may execute an application 342 that is installed on the customer device 302. The customer device 302 and/or the application 342 may then execute the appropriate code to display features of the merchant's online store onto the GUI 338.

Even though certain embodiments described herein describe the website as being hosted by the merchant server 340, the methods and systems described herein also apply to websites associated with the merchant server 340 that are hosted by a third-party webserver. Furthermore, the methods described herein are also applicable in other environments such as non-ecommerce infrastructures and system architectures. The webpage presented on the GUI 338 may include an electronic cart where the customer can use the browser 334 to add products and complete the transaction by inputting sensitive information such as payment information.

The customer device 302 may be a mobile phone, tablet, gaming console, laptop, or computer owned and/or used by a customer. The customer device 302 may include a processor 330, memory 332, GUI 338, and network interface 336. An example of the GUI 338 is a display screen (which may be a touch screen). The network interface 336 is provided for communicating over the network 328. The structure of the network interface 336 will depend on how the customer device 302 interfaces with the network 328. For example, if the customer device 302 is a mobile phone or tablet, the network interface 336 may include a transmitter/receiver with an antenna to send and receive wireless transmissions to/from the network 328.

The customer device 302 may be connected to the network 328 with a network cable. The network interface 336 may include, for example, a network interface card (NIC), a computer port, and/or a network socket. The processor 330 directly performs or instructs all of the operations performed by the customer device 302. Non-limiting examples of these operations include processing customer inputs received from the GUI 338, preparing information for transmission over the network 328, processing data received over the network 328, and instructing a display screen to display information. The processor 330 may be implemented by one or more processors that execute instructions stored in the memory 332. Alternatively, some or all of the processor 330 may be implemented using dedicated circuitry, such as an ASIC, a GPU, or a programmed FPGA.

The e-commerce platform 306 is a computing system infrastructure that may be owned and/or managed (e.g., hosted) by an e-commerce service and, in some embodiments, may be the same as or similar to that described with reference to FIGS. 1-2, though this need not be the case. The e-commerce platform 306 includes electronic hardware and software components capable of performing various processes, tasks, and functions of the e-commerce platform 306. For instance, the computing infrastructure of the e-commerce platform 306 may comprise one or more platform networks (not shown) interconnecting the components of the e-commerce platform 306. The platform networks may comprise one or more public and/or private networks and include any number of hardware and/or software components capable of hosting and managing the networked communication among devices of the e-commerce platform 306.

As depicted in FIG. 3, the components of the e-commerce platform 306 include the analytics server 318 and a platform database 308. However, the embodiments may include additional or alternative components capable of performing the operations described herein. In some implementations, certain components of the e-commerce platform 306 may be embodied in separate computing devices that are interconnected via one or more public and/or private internal networks (e.g., network 328). In some implementations, certain components of the e-commerce platform 306 may be integrated into a single device. For instance, the analytics server 318 may host the platform database 308.

Furthermore, the e-commerce platform 306 may include the analytics server 318 configured to serve various functions of the e-commerce platform 306. Non-limiting examples of such functions may include webservers hosting webpages (or at least a portion of a webpage, such as the checkout portion) on behalf of merchants (e.g., merchants' online stores), security servers executing various types of software for monitoring web traffic (e.g., determining that a customer has accessed an electronic platform hosted by the merchant server 340), and database servers hosting various platform databases 308 of the e-commerce platform 306, among others.

The illustrative e-commerce platform 306 is shown and described as having only one analytics server 318 performing each of the various functions of the e-commerce service. For instance, the analytics server 318 is described as serving the functions of executing a GUI revision engine 322 and a webserver (hosting webpages for merchants' online stores and account administration. It is intended that FIG. 3 is merely illustrative and that embodiments are not limited to the description of the system 300 or the particular configuration shown in FIG. 3. The software and hardware of the analytics server 318 may be integrated into a single distinct physical device (e.g., a single analytics server 318) or may be distributed across multiple devices (e.g., multiple analytics servers 318).

For example, some operations may be executed on a first computing device while other operations may be executed on a second computing device, such that the functions of the analytics server 318 are distributed among the various computing devices. In some implementations, the analytics server 318 may be a virtual machine (VM) that is virtualized and hosted on computing hardware configured to host any number of VMs.

The platform database 308 stores and manages data records concerning various aspects of the e-commerce platform 306, including information about, for example, actors (e.g., merchants, customers, or platform administrators), electronic devices, merchant offerings (e.g., products, inventory, or services), delivery methods, various metrics and statistics, machine-learning models, merchant pages hosting merchant stores, and other types of information related to the e-commerce platform 306 (e.g., usage and/or services).

The platform database 308 may also include various libraries and data tables including detailed data needed to perform the methods described herein, such as revising the merchant's online store. For instance, the analytics server 318 may generate a data table associated with different products offered by different merchants and/or merchants' online stores. In another example, the analytics server 318 may generate and periodically update a customer profile associated with different customers where data records within the customer profile include data associated with different customers (e.g., historical purchases, purchase preferences, and/or payment information).

Various predetermined rules, regulations, and thresholds discussed herein may be set by the analytics server 318 or a system administrator of the e-commerce platform 306. Additionally or alternatively, the customer operating the customer device 302 and/or the merchant server 340 may input or modify the predetermined rules.

The platform database 308 may be hosted on any number of computing devices having a processor (sometimes referred to as a database (DB) processor 320) and non-transitory machine-readable memory configured to operate as a DB memory 310 and capable of performing the various processes and tasks described herein. For example, one or more analytics servers 318 may host some or all aspects of the platform database 308.

A computing device hosting the platform database 308 may include and execute database management system (DBMS) 314 software, though a DBMS 314 is not required in every potential embodiment. The platform database 308 can be a single, integrated database structure or may be distributed into any number of database structures that are configured for some particular types of data needed by the e-commerce platform 306. For example, a first database could store user credentials and be accessed for authentication purposes, and a second database could store raw or compiled machine-readable software code (e.g., HTML, JavaScript) for webpages such that the DB memory 310 is configured to store information for hosting webpages.

The computing device hosting the platform database 308 may further include a DB network interface 324 for communicating via platform networks of the e-commerce platform 306. The structure of the DB network interface 316 will depend on how the hardware of the platform database 308 interfaces with other components of the e-commerce platform 306. For example, the platform database 308 may be connected to the platform network with a network cable. The DB network interface 324 may include, for example, a NIC, a computer port, and/or a network socket. The processor 320 directly performs or instructs all of the operations performed by the platform database 308.

Non-limiting examples of such operations may include processing queries or updates received from the analytics server 318, customer device 302, and/or merchant server 340; preparing information for transmission via the platform network and/or the external networks. The processor 320 may be implemented by one or more processors that execute instructions stored in the DB memory 310 or other non-transitory storage medium. Alternatively, some or all of the DB processor 312 may be implemented using dedicated circuitry such as an ASIC, a GPU, or a programmed FPGA.

The DB memory 310 of the platform database 308 may contain data records related to, for example, customer activity, and various information and metrics derived from web traffic involving customer accounts. The data may be accessible to the analytics server 318. The analytics server 318 may issue queries to the platform database 308 and data updates based upon, for example, successful or unsuccessful authentication sessions.

The analytics server 318 may be any computing device that comprises a processor 320 and non-transitory machine-readable storage media (e.g., server memory 326) and that is capable of executing the software for one or more functions such as the GUI revision engine 322. In some cases, the server memory 326 may store or otherwise contain the computer-executable software instructions, such as instructions needed to execute the GUI revision engine 322. The software and hardware components of the analytics server 318 enable the analytics server 318 to perform various operations that serve particular functions of the e-commerce platform 306.

For example, the analytics server 318 that serves as a webserver may execute various types of webserver software (e.g., Apache® or Microsoft IIS®). As another example, the analytics server 318 may cause the merchant's online store to be revised in accordance with the methods described herein. The analytics server 318 may either directly revise the online store or instruct the merchant server 340 or any other webserver to revise the online store accordingly. It is intended that these are merely examples and not intended to be limiting as to the potential arrangements or functions of the analytics server 318. Non-limiting examples of the analytics server 318 may include desktop computers, laptop computers, and tablet devices, among others.

The analytics server 318 may execute the GUI revision engine 322 that directly or indirectly revises the GUI accessed by the customer operating the customer device 302 (merchant's online store). For instance, the GUI revision engine 322 may transmit an instruction that causes the merchant server 340 to revise one or more items displayed within the online store in accordance with the methods described herein. The location of the GUI revision engine 322 is merely an example. The GUI revision engine 322 may be executed by the analytics server 318 and/or by the customer device 302 under the direction of the analytics server 318. Therefore, the GUI revision engine 322 can be performed locally on a customer's device or in the back-end of the system 300.

Additionally or alternatively, the GUI revision engine 322 could be provided by the e-commerce platform 306 as a separate web-based or cloud-based service. In some implementations, the GUI revision engine 322 is implemented at least in part by a user device such as the customer device 302 and/or the merchant server 340. Other implementations of the GUI revision engine 322 are also contemplated such as a stand-alone service to dynamically revise features of any website. While the GUI revision engine 322 is shown as a single component of the e-commerce platform 306, the GUI revision engine 322 could be provided by multiple different components that are in networked communication with the analytics server 318 executing the GUI revision engine 322.

The merchant server 340 may be any server associated with a merchant hosting an online store. The merchant server 340 may be any computing device hosting a website (or any other electronic platform) accessible to customers (e.g., operating the customer device 302) via the network 328. The merchant server 340 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the merchant server 340 may include workstation computers, laptop computers, server computers, laptop computers, and the like. While the system 300 includes a single merchant server 340, in some embodiments the merchant server 340 may include a number of computing devices operating in a distributed computing environment.

The merchant server 340 may be configured to interact with one or more software modules of a same or a different types depicted within the system 300. For instance, the merchant server 340 may execute software applications configured to host an electronic platform which may generate and serve various webpages to the customer device 302. The electronic platform may also embed various GUIs generated by the analytics server 318. The online store hosted by the merchant server 340 may be configured to require user authentication based upon a set of user authorization credentials (e.g., username, password, biometrics, cryptographic certificate, and the like).

III. Example Methods of Dynamically Revising Pages

Figure 4:
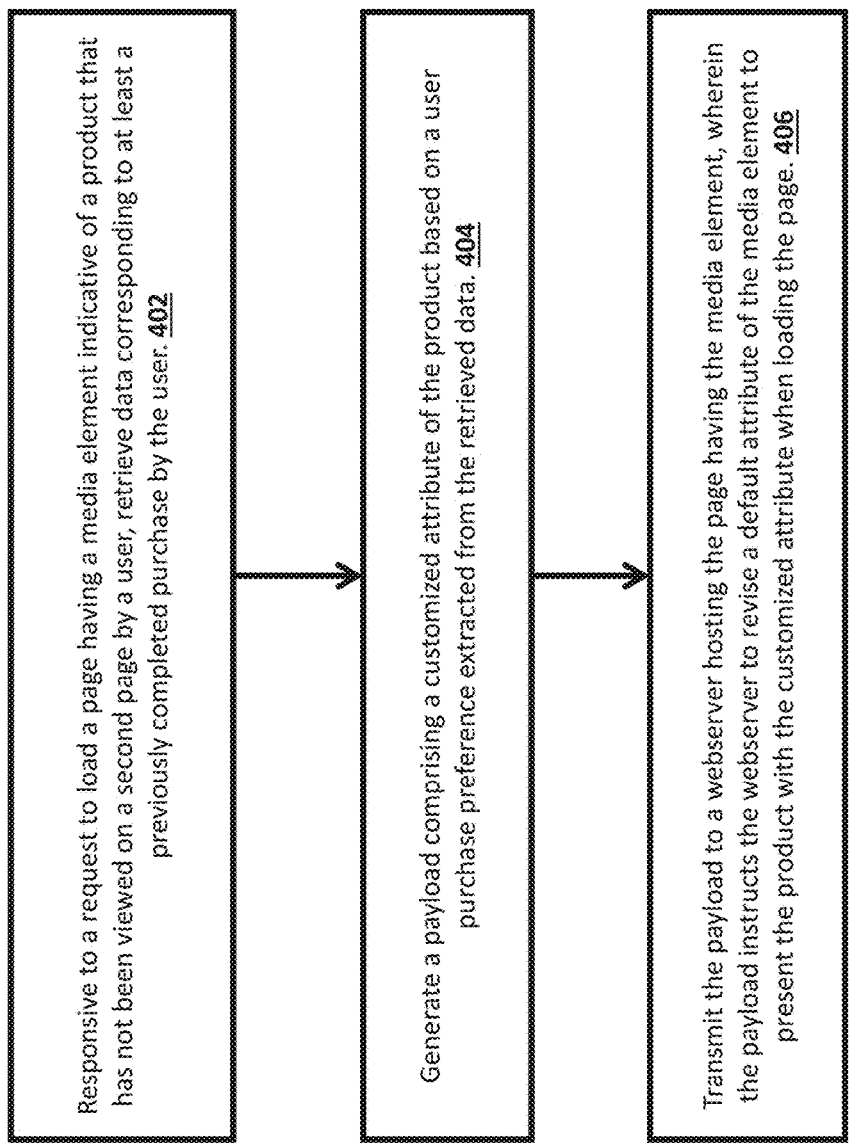
FIG. 4 shows execution steps for a dynamic product presentation system, according to an embodiment.

FIG. 4 illustrates a flowchart depicting operational steps for a dynamic product presentation system, in accordance with an embodiment. The method 400 describes how a server, such as the analytics server described in FIG. 3, can dynamically revise a GUI presenting a media element depicting a product based on a customer's unique characteristics. The method 400 is described in the context of revising visual attributes of a page associated with a merchant's online store that displays various products to be sold and/or delivered by a merchant. Therefore, as described herein, the page may refer to any electronic platform configured to display media elements (e.g., a website for the merchant's online store or an application (e.g., mobile application) for the merchant's online store).

Even though the method 400 is described as being executed by the analytics server, the method 400 can be executed by any server and/or locally within a customer's trusted device (e.g., the customer device discussed in FIG. 3). Additionally or alternatively a server can execute the method 400 in other computer environments (other than the environments depicted in FIGS. 1-3). For instance, the method 400 can be executed by a server providing SaaS in a non-commerce infrastructure for any electronic platform.

Additionally or alternatively, the method 400 may be executed by a webserver hosting a page (e.g., a website associated with the merchant's online store or content for a mobile application) and executing various revision methods described herein. Additionally or alternatively, the method 400 may be executed by a server hosting an application configured to display a page associated with the merchant's online store and acting as the analytics server by executing various revision methods described herein. Furthermore, other configurations of the method 400 may comprise additional or alternative steps, or may omit one or more steps altogether.

The methods described herein may be implemented as a standalone service (e.g., browser extension) or implemented via a local application on the customer's electronic device. The methods described herein are applicable to any electronic content, such as media elements depicting products (e.g., images and videos) on a website, mobile application, video streaming services, and the like.

At step 402, the analytics server may, responsive to a request to load a page having a media element indicative of a product that has not been viewed on a second page by a user, retrieve data corresponding to at least a commerce attribute of the user.

The server may monitor customer activities on an electronic platform (e.g., website or third-party applications) using various methods. For instance, using a local application installed/executing on the customer's computer or mobile phone (e.g., a browser extension or an application installed on the customer's device that is in communication with the analytics server), the analytics server may monitor pages accessed (or requested to be accessed) by the customer to determine whether the page includes a customizable media element depicting a product. The analytics server may also determine whether the product is offered for sale. For instance, the analytics server may determine whether a webserver hosting the page offers the product for sale (e.g., through a merchant). The server may make this determination by using an identifier of the page (e.g., domain name of a website) or via communicating with the webserver hosting the page to retrieve metadata associated with one or more features of the page.

Using an application installed on the user device, via a browser extension, or via communicating with the webserver, the analytics server may receive an indication that a customer has requested to load a page associated with the webserver. The page, as used herein, may refer to a website or any other electronic platform hosted or otherwise functionally controlled by the webserver. For instance, the page may represent a user interface of an electronic platform that streams videos or displays media elements that depict one or more products.

When the analytics server receives the indication that the customer has requested a page to be loaded on the customer device, the analytics server may analyze the page and determine whether the page includes at least one media element that is customizable and/or depicts a product that is commercial in nature. As used herein, a customizable media element refers to a media element that depicts a product where at least one attribute of the product (as depicted within the media element) can be revised based on instructions received from the analytics server. An example of a customizable media element may include an image that depicts a pair of blue shoes where the media element can be customized, such that the shoes are depicted as green instead.

In a non-limiting example, the analytics server may retrieve a URL associated with the page (website) and query and retrieve data associated with the page. For instance, the analytics server may have access to a pre-generated list of different websites, their corresponding URLs and a list of customizable media elements within the website and the products depicted within each media element. For instance, the analytics server may determine that a website (having a particular URL) has five images and each image is customizable.

In another non-limiting example, the analytics server may transmit a notification to the webserver hosting the page (or a web browser displaying the page or a browser extension). The notification may instruct the webserver to transmit metadata associated with one or more media elements of the page. The analytics server may then analyze the metadata and determine whether (and if any) of the media elements are customizable and/or depict a product that is commercial in nature. The metadata received from the webserver may indicate data associated with the product(s) depicted within different media elements outputted on the page. The metadata may include information associated with the product depicted in the media element (e.g., product name, merchant offering the product, website associated with each merchant, each merchant's price, available colors, sizes, and styles, or any other information). The analytics server may retrieve metadata associated with the media element and analyze the metadata to identify data associated with the product. For example, the webserver may transmit a notification that includes a list of media elements and their corresponding depicted products.

The analytics server may also determine attributes of the product depicted within the media element. For instance, the analytics server may, using the metadata received, determine that the product depicted within an image corresponds to men's shoes of a particular style and color. In some embodiments, the analytics server may also identify a default attribute associated with the depicted product. For instance, the metadata may indicate that the pair of shoes are to be presented in blue (e.g., default attribute of the product). The metadata may also include data indicating whether a media element is customizable. For instance, the webserver may not allow all the media elements to be customized by the analytics server (or other third party servers).

The analytics server may also receive/retrieve a user identifier associated with the customer. Upon the customer requesting to load the page, the local application, the browser extension, and/or the webserver may transmit an electronic message (e.g., token) to the analytics server that may include a user identifier (UID). The UID may be a unique identifier associated with the customer, which may be utilized to recognize the customer accessing the page. For instance, the customer may have provided login token (e.g., name, UID, email address, phone number, mailing address, other personally-identifiable information, web authentication ID or Face ID, and/or any other biometric authentication data, such as fingerprint data) when generating a user profile associated with the analytics server (e.g., using the application). The login token may be encrypted, such that the sensitive data may not be inappropriately accessed.

The UID may also refer to a unique identifier of the customer device, such as an IP address, MAC address, or any other identifier associated with the user device. The analytics server may use this information to identify an account of the customer, which may include payment information, recent purchases, credentials, authorized communication channels and devices, saved preferences, and other information (e.g., payment information, size, color, and style preferences determined based on previous purchases and user inputs).

Using the UID, the analytics server may access the customer profile to determine a list of products recently viewed by the customer. As discussed above, the analytics server may continuously monitor online activity of the customer and store the corresponding data within the customer profile. For instance, the customer profile may include a list of products purchased, searched, or viewed by the customer. In some configurations, the analytics server may augment the data within the customer profile using other third-party data, such as cookies. In some embodiments, the products viewed by the customer may indicate products viewed on other pages (e.g., pages other than the page hosted by the webserver). An example of a second page (or other page) may include another webpage used by the customer to search for or view various products.

The analytics server may, in some embodiments, only apply the method 400, to media elements that are customizable. Additionally or alternatively, the analytics server may only apply the method 400 to media elements depicting products that have not been viewed by the customer within a defined window of time (e.g., five days or 2 hours). For instance, if a media element depicts a product that has been searched by the customer (or otherwise viewed by the customer) within the defined window of time, the analytics server may not apply the method 400 and customize the appearance of the product within the media element. In this way, the analytics server may ensure that customers do not receive unwanted customization based on their recent online activity.

The analytics server may receive the above-described data from any combination of the webserver, browser extension, and the application. Therefore, receiving the data discussed in the step 402 is not limited to a particular order or feature. For instance, when a customer requests a page to be loaded, the application executing locally on the customer device may transmit the user identifier to the analytics server. However, metadata associated with the image may be transmitted by the webserver or the browser extension. Alternatively, the local application may communicate with the webserver and/or the browser extension, aggregate all the data discussed herein (a user's identifier and the metadata) and transmit the aggregated data using a single electronic message.

Although this example recites loading of a webpage, it is intended that the disclosure may be also be applied to a video (such as a streaming video) displayed on a browser or other application. In such an embodiment, step 402 may include a request from a customer to load a page that contains or is showing a video, or the request may be for a segment of a video that includes the particular media element. This segment may be a portion of a streaming video.

In some embodiments, the analytics server may perform the above-described analysis before the customer request the page to be loaded. For instance, the webserver may periodically transmit an electronic message to the analytics server identifying all the media elements displayed within the page and their corresponding metadata (indicating the products depicted in each media element and information about the product and identifying whether a media element is customizable). As a result, the analytics server may analyze the data associated with the products and generate a list of all the media elements within the page, products depicted within each media element, and their corresponding information. When the customer requests a page to be loaded, the analytics server may identify the page (using the unique identifier), such that the analytics server can provide low latency dynamic revision of the page using the method 400.

At step 404, the analytics server may generate a payload comprising a customized attribute of the product based on a user purchase preference extracted from the retrieved data.

In addition to identifying the customer's previous activities, the analytics server may use the user identifier to retrieve a customer profile that includes customer data and preferences (e.g., payment information, size, color preferences, style preference, categories of products preferred determined based on previous purchases and user inputs, product and/or produce category preferences and applicable discounts or other benefits). In embodiments where the user has installed an application in communication with the analytics server, the analytics server may directly communicate with the application on the customer device to identify data associated with the customer, to retrieve customer preferences, and/or determine the customer's recent activity. The server may configure the payload to be unique to the customer and include the data retrieved, such that the page can be rendered/customized using that payload.

The analytics server may identify the customer's preferences based on the customer profile. The customer profile may include the customer's preferred method of delivery, shipping address, preferred payment method and corresponding data, and other preferences (e.g., size, color, pattern, and style). The customer profile may also include insights previously analyzed and extracted by the analytics server. For instance, the customer profile may include historical data associated with the customer's previous purchases and deliveries. The analytics server may apply (or may have previously applied) various analytical protocols and rules to infer insights from the customer's previously completed purchases. For instance, the analytics server may apply a computer model (e.g., machine learning or other algorithmic models) to infer that the customer's preferred shoe color is white and preferred shoe style is two-tone because the customer has selected two-tone shoes 85% of the time or the user prefers to use a particular credit card when purchasing items that cost more than $100.

The customer profile may also include various rules that can be applied to identify the customer's preferred delivery method. For instance, the user may have previously identified that the customer prefers expedited delivery for items purchased from a particular merchant or when purchasing books. In another example, the customer may have previously identified that the customer prefers drone or bike delivery when purchasing food but prefers automobile delivery when purchasing other items. In yet another example, the customer may have previously identified that the customer prefers drone delivery for purchases that are more than $50.

Using the data extracted from the customer profile, the payload (or other forms of electronic messages) may also include the data necessary for the webserver to customize the media element. The analytics server may include the data that is categorically associated with the product to be customized within the media element. For instance, if the product to be customized is a pair of shoes, the analytics server may include data associated with the customer's preferred style (e.g., two-tone shoes).

At step 406, the analytics server may transmit the payload to a webserver hosting the page having the media element, wherein the payload instructs the webserver to revise a default attribute of the media element to present the product with the customized attribute when loading the page. The analytics server may cause a dynamic revision of the page that displays one or more media elements by customizing attributes of a depicted product for the customer viewing/accessing the page. The analytics server may provide instructions to the webserver to display the customized/revised attributes as an overlay to the media element. In another example, a pluggable component (e.g., plug-in software component) may insert a customized overlay within the software script of the website.

As used herein, an attribute of the media element refers to any attribute that is displayed within the media element and is not limited to attributes of the product depicted within the media element. For instance, attributes of the media element may include written words and advertisement or description of the product as well as color, style, and shape of the product. Some media elements may also display a price and/or other words describing the product. Using the methods and systems described herein, the analytics server may also change those attributes, such that they are customized for the customer. For instance, the webserver or the analytics server may also customize price points and other attributes of the media element depicting at least one attribute of the product.

If the payload indicates that the user can benefit from a discount (e.g., club membership), the price depicted within the media element may be changed accordingly, such that each customer views a price based on their unique attributes. For instance, a customer's account or profile may indicate that the customer is a member of American Association of Retired Persons (AARP). As a result, the analytics server identifies whether the merchant offers discounts based on AARP membership. The analytics server may then transmit an instruction to the webserver to apply the AARP discount to the price of the product and generate/display the discounted price instead of the default price.

In some embodiments, the analytics server may allow the customer to purchase the product by interacting with the media element. When the analytics server determines that the customer has interacted with a media element (e.g., the user has clicked on the media element). The analytics server may then instruct the webserver to initiate a checkout process for the product depicted within the media element. In some embodiments, the webserver may automatically initiate the checkout process. The analytics server may then transmit the payload and instruct the webserver to initiate the checkout process using one or more attributes that are customized for the customer, such that the customer purchases the product with attributes and purchases preferences of the customer.

The server may also inform the webserver to modify payment options based on the payload. For instance, the server may generate a hash of user identifiers (e.g., device ID or e-mail of users). The server may then transmit the hashed values to the webserver and inform the webserver of a particular payment method or payment information associated with each customer. For instance, the hashed value may indicate that a customer has installed an application that is in communication with the analytics server and can facilitate the payment. As a result, if the customer attempts to purchase a product, the webserver may request the application to facilitate the payment and may execute payment protocols that are customized for the customer and not default to the merchant. For instance, instead of directing the customer to input payment information (default payment protocol for the merchant), such as credit card numbers, the webserver may ping the application (or the analytics server) that the transaction must be finalized by facilitating the payment.

The webserver may then transmit a total transaction amount to the application and/or the analytics server. The analytics server may then instruct the application to finalize the transaction by processing the payment for the identified amount. For instance, the analytics server may instruct the application to display a push notification on an authorized electronic device of the customer (e.g., mobile device). The push notification may display the transaction amount, merchant name, and/or information regarding the product. The push notification may include interactive buttons configured to receive a confirmation from the customer. When the analytics server receives a confirmation via the application, the analytics server may then finalize the transaction by processing the payment or instructing a third-party financial server to process the payment.

Figure 7:
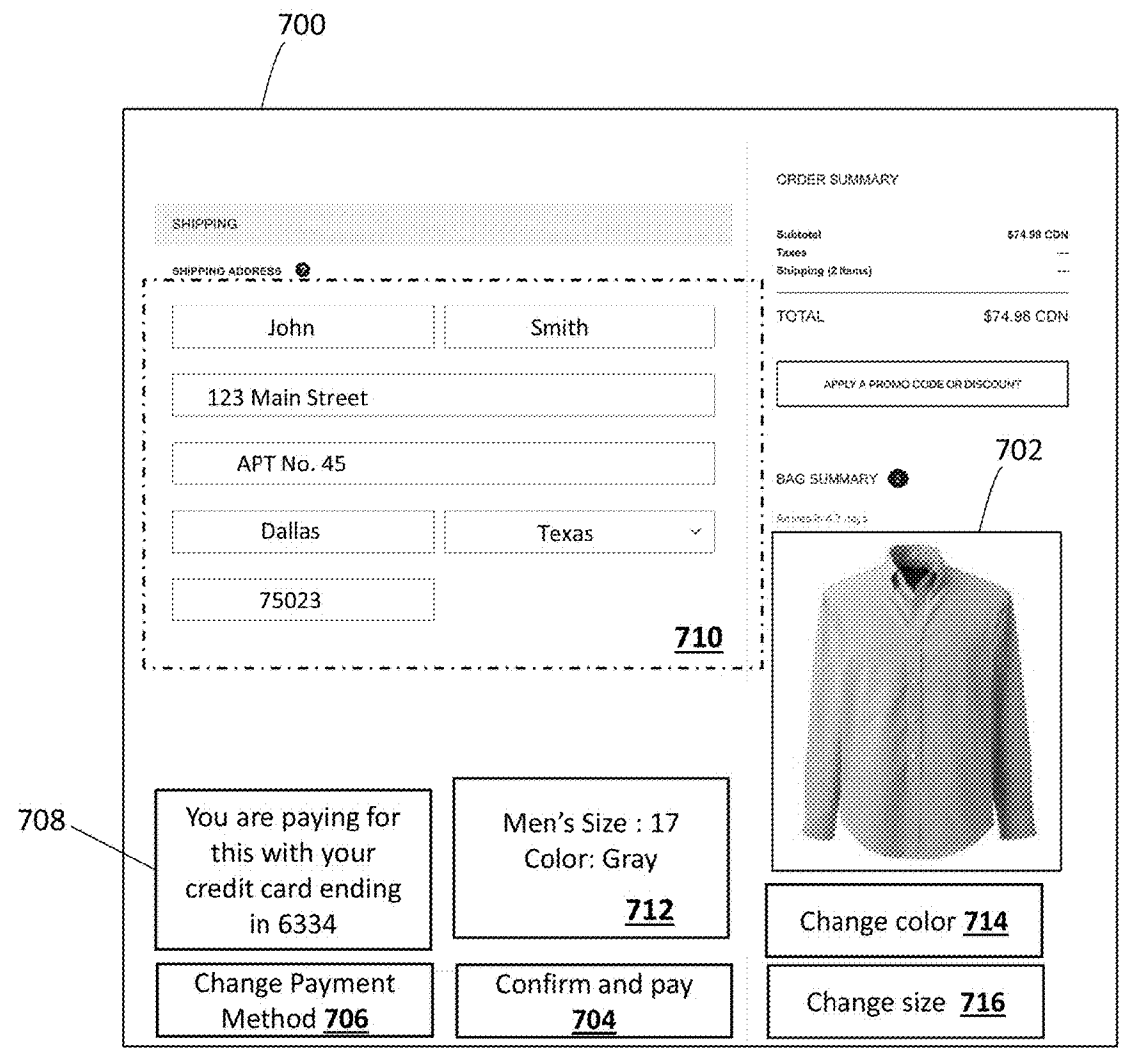

Alternatively, the analytics server may use the customer's information (included within the payload) to prefill various input elements (e.g., size, color, or shipping method and address), such that a transaction can be completed without needing any additional information from the user other than a confirmation (as depicted in FIG. 7).

Figure 5A:
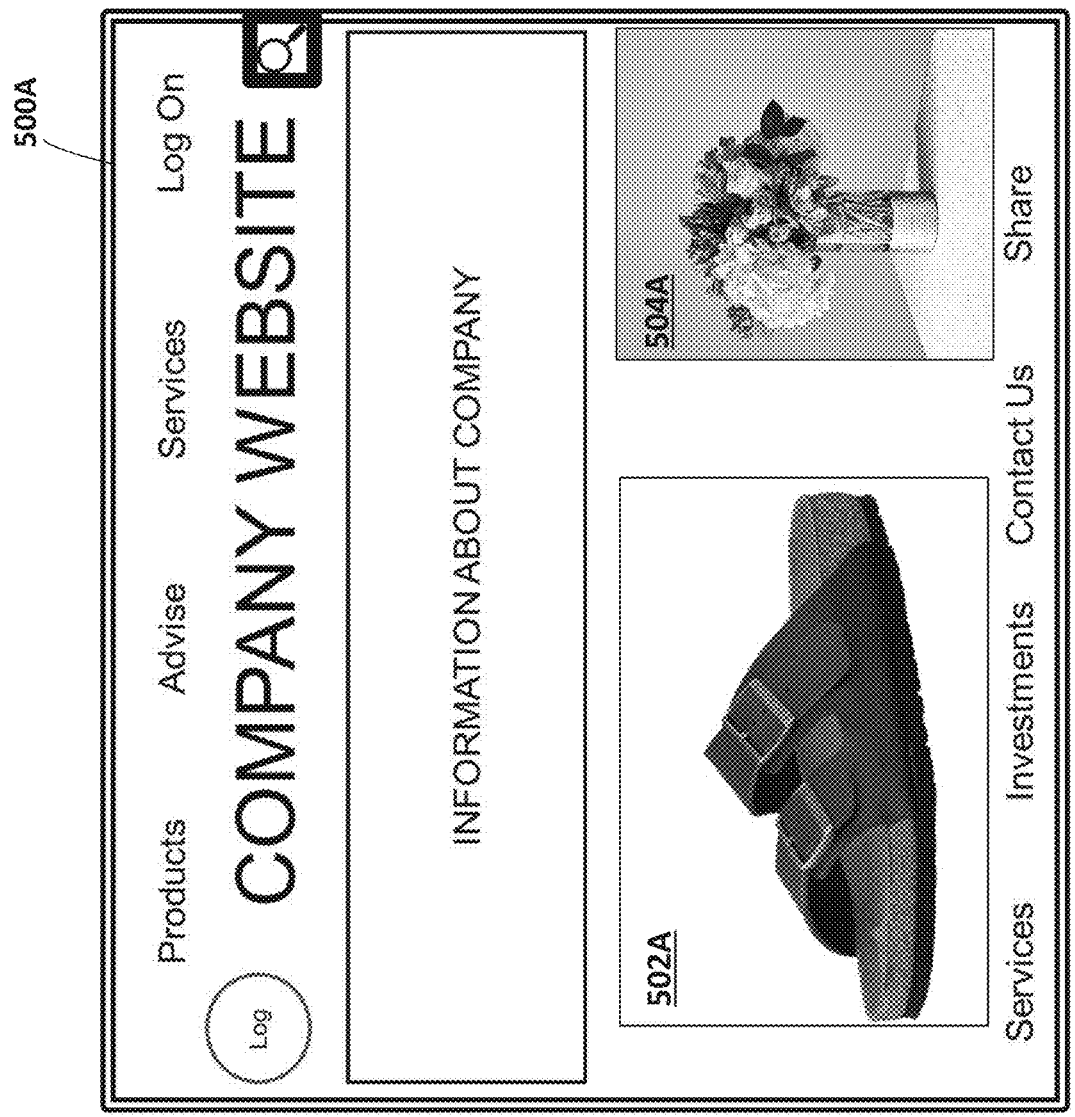
FIGS. 5A-6B show examples of dynamic revisions of graphical user interfaces by a dynamic product presentation system, according to various embodiments.
Figure 5B:
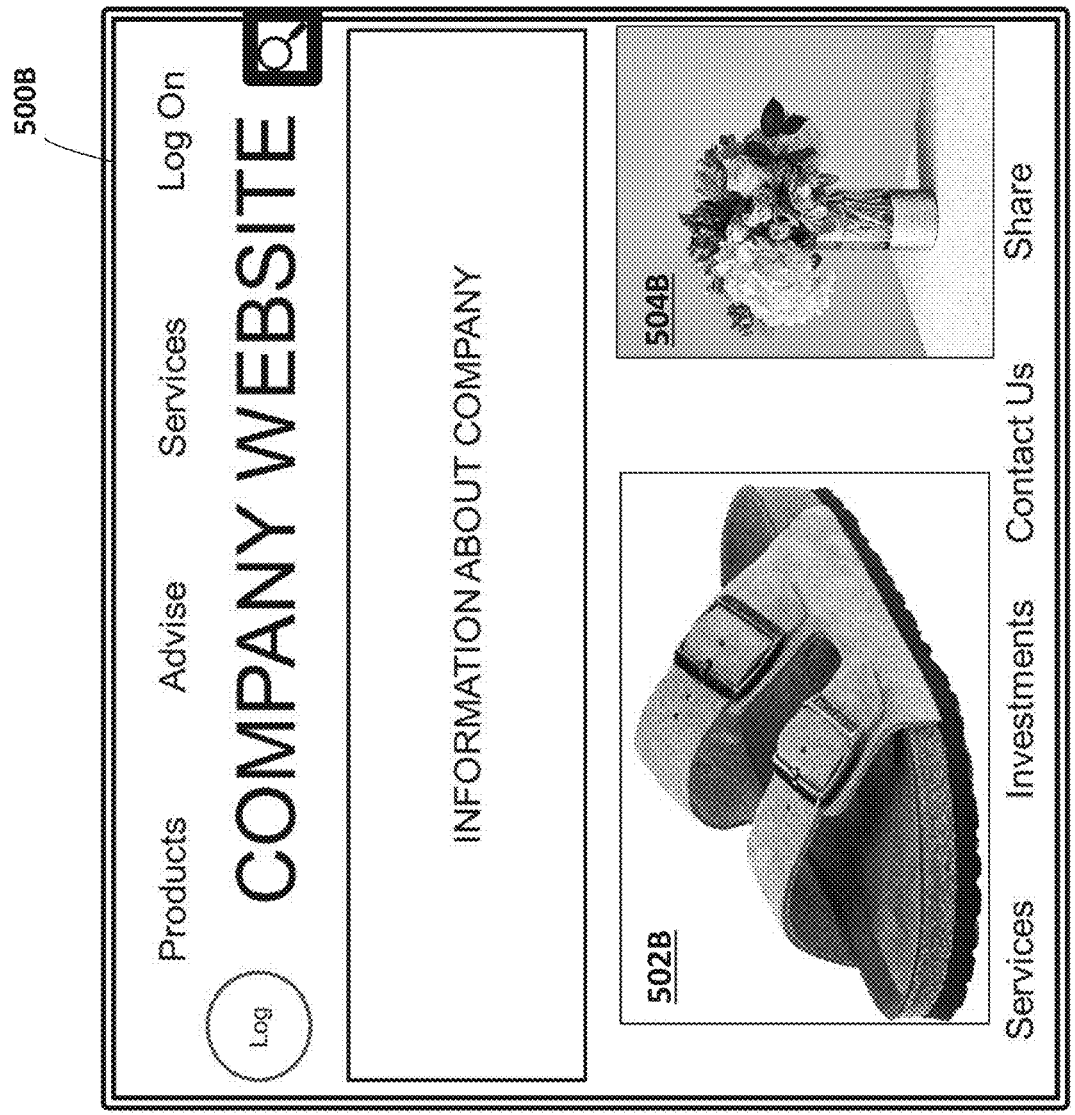

FIGS. 5A-5B illustrate a non-limiting example of the analytics server dynamically revising a presentation of one or more products depicted on a website. Referring to FIG. 5A, a customer may access the website 500A that represents a merchant's online store. However, the methods and systems discussed herein are not limited to merchant websites. Moreover, the methods described herein also apply to other electronic platforms utilizing different visualization methods and modalities, such as mobile applications or video streaming services.

The webserver hosting or otherwise functionally associated with the website 500 may be configured to display images 502A-504A where the image 502A depicts a sandal and the image 504A depicts flowers. The customer may purchase the pair of sandals and/or the flowers via a merchant associated with the webserver via the website 500A.

The image 502A may depict the product (a sandal) displayed using default attributes. For instance, as illustrated, the sandal within the image 502A is depicted as dark brown. In the embodiment depicted in FIGS. 5A-B, the analytics server uses the methods described herein to revise attributes of the sandal depicted within the image 502A and customize the depicted sandal based on the customer's purchase preferences and extracted attributes. As a result, the analytics server revises (or instructs the webserver to revise) the website 500A (default website) to the website 500B (e.g., website customized for the customer).

Using the methods and systems discussed herein, the analytics server may determine that the customer has accessed the website 500. For instance, the customer may use a browser application installed on a customer device to load the website 500. Upon the customer requesting access/loading the website 500, the webserver and/or an application monitoring the customer device may transmit a notification to the analytics server. The notification may include an identifier of the website 500 (e.g., URL of the website 500), such that the analytics server can identify the webserver hosting the website 500. The notification may also include a user identifier (UID).

The analytics server may use the methods described herein to revise attributes of the sandal depicted within the image 502A. Using the UID, the analytics server may retrieve a customer profile that includes insights extracted from the customer's previous purchases and transactions. Using the data included within the customer profile, the analytics server may determine that the customer viewing the website 500A is interested in white sandals (and not brown sandals). As a result, the analytics server may instruct the webserver to revise the color attribute of the sandal depicted within the image 502A having a dark brown sandal to an image 502B depicting a white sandal. For instance, the analytics server may generate an overlay that includes the revised color. The analytics server may then transmit the overlay to the webserver and instruct the webserver to display the overlay. In another example, the analytics server may transmit an identifier of the revised color and instruct the webserver to display the revised color instead of the default color.

In the depicted embodiment, the analytics server determines that the flowers depicted in the image 504A were previously viewed by the customer. As a result, the analytics server does not revise the depiction of the flowers (e.g., the images 504A and 504B are the same). The analytics server may make this determination using the customer profile that indicates that the customer conducted an online search for flowers matching attributes of the flowers depicted within the image 504A (e.g., received metadata from the webserver indicates that the customer has viewed flowers similar to the ones depicted in the image 504A two hours ago, which is within a defined time window threshold).

Figure 6A:
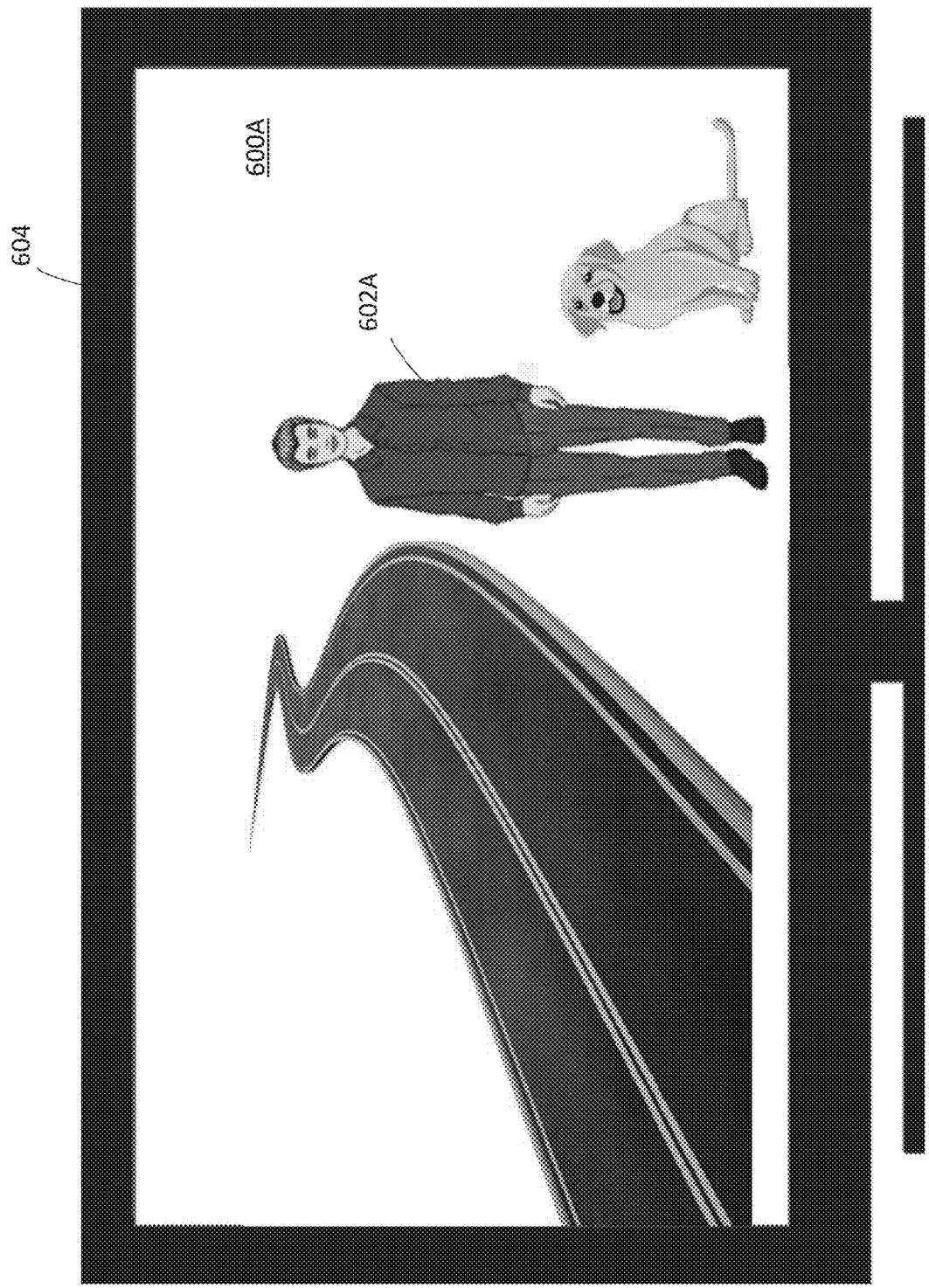

Referring now to the FIGS. 6A-6B, a dynamic revision of an attribute of a product depicted within a frame of a video media element is illustrated, in accordance with an embodiment. The frame 600A represents a frame within a video file outputted on a screen of an electronic device 604, such as a television, mobile device, or computer. As depicted, the frame 600A depicts a person wearing a dark shirt (graphical element 602A). The color of the shirt may be the default color associated with the media element (video file) that is being outputted by a webserver. Using the methods and systems described herein, the analytics server may instruct the webserver to change the color of the shirt from the dark color depicted in the graphical element 602A to the light color depicted in the graphical element 602B.

In operation, the analytics server may receive an identification of the frame 600A from the webserver along with data identifying different objects and products depicted within the frame 600A. For instance, the webserver may transmit metadata to the analytics server that indicates a timestamp associated with each frame of the video file being outputted on the electronic device 604. The metadata also indicates that the frame 600A includes a road, dog, and a person wearing a dark shirt. The webserver (or an application executing on the electronic device 604) may also transmit a UID of the user viewing the video file to the analytics server.

Using the UID, the analytics server may retrieve purchase preferences associated with the user viewing the video file (using the methods and systems described herein). The analytics server may determine that the user prefers to view a light (e.g., white) color shirt within the graphical element 602A. As a result, the analytics server instructs the webserver to revise the color of the shirt from dark (shown in graphical element 602A) to light (shown in graphical element 602B). As a result of the revision performed/instructed by the analytics server, a portion or all of the default frame 600A within the video file may be revised or replaced, such that the shirt's color is depicted differently (revised frame 600B).

The analytics server may perform the analysis and revisions discussed herein before the video file is outputted by the webserver or in real time as the webserver is outputting the video file (e.g., frame 600A). For instance, the analytics server may perform the revisions discussed herein as each frame (or a series of frames) is outputted by the webserver (e.g., in real time or in near real time).

Alternatively, the analytics server may perform the revisions (e.g., transmit instruction to revise to the webserver) before the video file (or at least a part of the video file) is outputted by the webserver. For instance, when the user requests the webserver to display the video file, the webserver or the application executing on the electronic device 604 may transmit an indication of the video file to the analytics server. The analytics server may analyze the frames within the video file and may instruct the webserver to revise one or more attributes of the products accordingly.

In some configurations, the analytics server may generate on-going revision instructions for the webserver to maintain visual continuity within the video file. For instance, if the analytics server instructs the webserver to revise the color of the shirt depicted in the frame 600A (to the color depicted within the frame 600B), the analytics server may instruct the webserver to change all instances of the same shirt within other frames of the video file as well, such that the character depicted within the video file is displayed as wearing the same color shirt.

The analytics server may also allow the user viewing the product depicted within the outputted media element to purchase the product. When the analytics server receives an indication that the user has interacted with the product depicted within the frame 600B (e.g., clicked on the product), the analytics server may generate an electronic message using the data received (e.g., user ID), payment data, a purchase preference for the user. That is, the analytics server may generate one or more attributes associated with the user's purchase, such as the user's preferred size, color, style, and the like. The analytics server may also transmit the user's payment information. The analytics server may instruct the webserver to initiate a checkout process (e.g., populate one or more input fields of a checkout page, such as the checkout page 700 depicted in FIG. 7).

The checkout page 700 may indicate the user's purchase preferences. Specifically, the graphical component 712 may indicate the user's preferences (e.g., indicating that the user would like the shirt to be gray and in size 17). The checkout page 700 may also include the image 702 that corresponds to the shoes customized per the user's purchase preferences. The user may change these attributes using the interactive buttons 714 or 716. The checkout page 700 may indicate that the transaction is to be facilitated using the user's pre-saved payment information (graphical element 708). The checkout page 700 may include the interactive button 706 allowing the user to change their payment method.

The checkout page 700 may also include various pre-populated input fields, such as the input fields 710 where the analytics server and/or the webserver have prefilled the user's shipping address based on data retrieved from the user's profile. To complete the transaction, the user can either change one or more attributes of the transaction using various interactive buttons discussed herein or can confirm and pay using the interactive button 704.

Even though FIGS. 6A, 6B, and 7 depict an embodiment in which the user device 604 is directed to a new page (e.g., the checkout page 700), in some configurations, the user device may not be directed towards a new page. For instance, the checkout input elements and other features depicted within the checkout page 700 may be a part of the frame 600B (or 500B). As a result, the user is no longer directed towards a new page. However, the checkout feature may still be prefilled as described herein.

Alternatively, the checkout process may be entirely performed via a background process and without involving the user (e.g., requesting the user for their input) or displaying anything. For instance, by initiating or executing the checkout process, the webserver and/or the analytics server may add the product (that has been customized per the user's preferences) to an electronic cart allowing the user to continue shopping/browsing until the user is ready to checkout. In some configurations, the user may be required (via interacting with a push notification) to confirm the transaction.

In an embodiment, a method comprises responsive to a request to load a page having a media element indicative of a product that has not been viewed on a second page by a user, retrieving, by a processor, data corresponding to at least a commerce attribute of the user; generating, by the processor, a payload comprising a customized attribute of the product based on a user purchase preference extracted from the retrieved data; and transmitting, by the processor, the payload to a webserver hosting the page having the media element, wherein the payload instructs the webserver to revise a default attribute of the media element to present the product with the customized attribute when loading the page.

The media element may be an image or a video.

The commerce attribute may correspond to a previously completed purchase by the user.

The data associated with the user further may comprise at least one of payment data, applicable discount data, or user membership data.

Instructing the webserver to present the customized attribute may comprise at least one of: revising, by the processor, a script executed by the webserver, or transmitting, by the processor, an overlay to the webserver.

The customized attribute of the media element may correspond to at least one of a price, a size, a style, or a color.

The payload may further comprise payment data associated with the user.

The method may further comprise upon an interaction with the media element, instructing, by the processor, the webserver to prefill at least one input element of a checkout page using at least one of the payment data or the customized attribute of the product.

The user identifier may be at least one of a user's name, email, login credentials, web authentication data, or face identification data, biometric authentication data, fingerprint identification data, internet protocol address, or media access control address.

The product may not have been viewed by the user for a defined period of time.

In another embodiment, a machine-readable storage medium having computer-executable instructions stored thereon that, when executed by one or more processors, cause the one or more processors to perform operations comprising: responsive to a request to load a page having a media element indicative of a product that has not been viewed on a second page by a user, retrieving data corresponding to at least a commerce attribute of the user; generating a payload comprising a customized attribute of the product based on a user purchase preference extracted from the retrieved data; and transmitting the payload to a webserver hosting the page having the media element, wherein the payload instructs the webserver to revise a default attribute of the media element to present the product with the customized attribute when loading the page.

The media element may be an image or a video.

The commerce attribute may correspond to a previously completed purchase by the user.

The data associated with the user further may comprise at least one of payment data, applicable discount data, or user membership data.

Instructing the webserver to present the customized attribute may comprise at least one of: revising, by the processor, a script executed by the webserver, or transmitting, by the processor, an overlay to the webserver.

The customized attribute of the media element corresponds to at least one of a price, a size, a style, or a color.

The payload further may comprise payment data associated with the user.

The instruction may further cause the one or more processors to: upon an interaction with the media element, instructing, by the processor, the webserver to prefill at least one input element of a checkout page using at least one of the payment data or the customized attribute of the product.

The user identifier may be at least one of a user's name, email, login credentials, web authentication data, or face identification data, biometric authentication data, fingerprint identification data, internet protocol address, or media access control address.

The product may not have been viewed by the user for a defined period of time.

In another embodiment, a computer system comprises a server having a processor, the server in communication with a computing device associated with a graphical user interface, the server configured to: responsive to a request to load a page having a media element indicative of a product that has not been viewed on a second page by a user, retrieve data corresponding to at least a commerce attribute of the user; generate a payload comprising a customized attribute of the product based on a user purchase preference extracted from the retrieved data; and transmit the payload to a webserver hosting the page having the media element, wherein the payload instructs the webserver to revise a default attribute of the media element to present the product with the customized attribute when loading the page.

The media element may be an image or a video.

The commerce attribute may correspond to a previously completed purchase by the user.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc., are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Neither the claimed features nor this disclosure is limited in terms of particular software code or specialized control hardware being used to implement the subject matter disclosed herein. Thus, the operation and behavior of the systems and methods were described without reference to the specific software code being understood that software and control hardware can be provided to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for customizing electronic pages, the method comprising:
    receiving, by at least one processor from an application executing on a user device, a request to load an electronic page hosted by a webserver, the electronic page having a media element indicative of an item that has not been viewed on a second page visited by a user, the media element having a set of default attributes for presenting the item within the electronic page;
    in response to identifying that the media element is a customizable media element, such that at least one default attribute of the set of default attributes for presenting the item is configured to be revised before loading the electronic page, retrieving, by the at least one processor, data corresponding to a user profile of the user;
    before loading the electronic page by the webserver:
        generating, by the at least one processor, a payload comprising a customized attribute of the item based on a user preference extracted from the retrieved data, the payload configured to cause the webserver to modify a script of the electronic page to include the customized attribute instead of the at least one default attribute; and
        causing, by the at least one processor, a dynamic revision of the electronic page, such that when loaded on the user device, the media element is rendered using the customized attribute by transmitting, by the at least one processor, the payload to the webserver hosting the electronic page having the media element.

2. The method of claim 1, wherein the data corresponding to the user profile comprises a previously completed purchase by the user.

3. The method of claim 1, wherein the data corresponding to the user profile comprises at least one of payment data, applicable discount data, or user membership data.

4. The method of claim 1, wherein instructing the webserver to present the customized attribute comprises at least one of:
revising, by the at least one processor, a script executed by the webserver, or transmitting, by the at least one processor, an overlay to the webserver.

5. The method of claim 1, wherein the customized attribute of the media element corresponds to at least one of a price, a size, a style, or a color.

6. The method of claim 1, wherein the payload further comprises payment data associated with the user.

7. The method of claim 6, further comprising: upon an interaction with the media element, instructing, by the at least one processor, the webserver to prefill at least one input element of a checkout page using at least one of the payment data or the customized attribute of the item.

8. The method of claim 1, wherein the data corresponding to the user profile comprises at least one of a user's name, email, login credentials, web authentication data, or face identification data, biometric authentication data, fingerprint identification data, internet protocol address, or media access control address.

9. The method of claim 1, wherein the item has not been viewed by the user for a defined period of time.

10. A machine-readable storage medium for customizing electronic pages, the machine-readable storage having computer-executable instructions stored thereon that, when executed by one or more processors, cause the one or more processors to perform operations comprising:
receiving, from an application executing on a user device a request to load an electronic page hosted by a webserver, the electronic page having a media element indicative of an item that has not been viewed on a second page visited by a user, the media element having a set of default attributes for presenting the item within the electronic page;
in response to identifying that the media element is a customizable media element, such that at least one default attribute of the set of default attributes for presenting the item is configured to be revised before loading the electronic page, retrieving data corresponding to a user profile of the user
before loading the electronic page by the webserver:
generating a payload comprising a customized attribute of the item based on a user preference extracted from the retrieved data, the payload configured to cause the webserver to modify a script of the electronic page to include the customized attribute instead of the at least one default attribute; and
causing a dynamic revision of the electronic page, such that when loaded on the user device, the media element is rendered using the customized attribute by transmitting the payload to the webserver hosting the electronic page having the media element.

11. The machine-readable storage medium of claim 10, wherein the data corresponding to the user profile comprises a previously completed purchase by the user.

12. The machine-readable storage medium of claim 10, wherein the data corresponding to user profile further comprises at least one of payment data, applicable discount data, or user membership data.

13. The machine-readable storage medium of claim 10, wherein instructing the webserver to present the customized attribute comprises at least one of:
revising a script executed by the webserver, or transmitting an overlay to the webserver.

14. The machine-readable storage medium of claim 10, wherein the customized attribute of the media element corresponds to at least one of a price, a size, a style, or a color.

15. The machine-readable storage medium of claim 10, wherein the payload further comprises payment data associated with the user.

16. The machine-readable storage medium of claim 15, wherein the computer-executable instructions cause the one or more processors to:
upon an interaction with the media element, instruct the webserver to prefill at least one input element of a checkout page using at least one of the payment data or the customized attribute of the item.

17. The machine-readable storage medium of claim 10, wherein the data corresponding to the user profile comprises at least one of a user's name, email, login credentials, web authentication data, or face identification data, biometric authentication data, fingerprint identification data, internet protocol address, or media access control address.

18. The machine-readable storage medium of claim 10, wherein the item has not been viewed by the user for a defined period of time.

19. A computer system comprising:
receive, from an application executing on a user device a request to load an electronic page hosted by a webserver, the electronic page having a media element indicative of an item that has not been viewed on a second page visited by a user, the media element having a set of default attributes for presenting the item within the electronic page;
in response to identifying that the media element is a customizable media element, such that at least one default attribute of the set of default attributes for presenting the item is configured to be revised before loading the electronic page, retrieving data corresponding to a user profile of the user
before loading the electronic page by the webserver:
generate a payload comprising a customized attribute of the item based on a user preference extracted from the retrieved data, the payload configured to cause the webserver to modify a script of the electronic page to include the customized attribute instead of the at least one default attribute; and
cause a dynamic revision of the electronic page, such that when loaded on the user device, the media element is rendered using the customized attribute by transmitting the payload to the webserver hosting the electronic page having the media element.

20. The computer system of claim 19, wherein the data corresponding to the user profile comprises a previously completed purchase by the user.

* * * * *